US005867199A

United States Patent [19]

Knox et al.

[11] Patent Number: 5,867,199

[45] Date of Patent: Feb. 2, 1999

[54] MEDIA GUIDANCE SYSTEM FOR A SCANNING SYSTEM

[75] Inventors: Jeffrey Knox; Larry S. Blake, both of Peabody; Arthur R. Newton, Jr., North Reading, all of Mass.

[73] Assignee: Agfa Division, Bayer Corporation, Wilmington, Mass.

[21] Appl. No.: 412,042

[22] Filed: Mar. 28, 1995

[51] Int. Cl.[6] .............................. B41J 2/385; B41J 2/435; G01D 15/34; G03G 13/04

[52] U.S. Cl. ........................... 347/139; 347/262; 347/264

[58] Field of Search ..................................... 347/262, 264, 347/139; 399/117, 21; 400/55, 56; 346/138; 271/246

[56] References Cited

U.S. PATENT DOCUMENTS 5,579,115 11/1996 Stein et al. .............................. 347/139

*Primary Examiner*—Benjamin R. Fuller
*Assistant Examiner*—L. Anderson
*Attorney, Agent, or Firm*—John A. Merecki

[57] ABSTRACT

A media guidance system for substantially reducing media jamming as the leading (head) end of a web of recording media is directed over the drum surface of an internal drum type laser imagesetter during a media loading procedure. The media guidance system includes a hollow shield, at least one outrigger extending laterally away from the hollow shield, and at least one retractable plate assembly for selectively applying a pressure load against the leading end of the recording media as it approaches the exit aperture of the internal drum.

33 Claims, 5 Drawing Sheets

FIG. 5
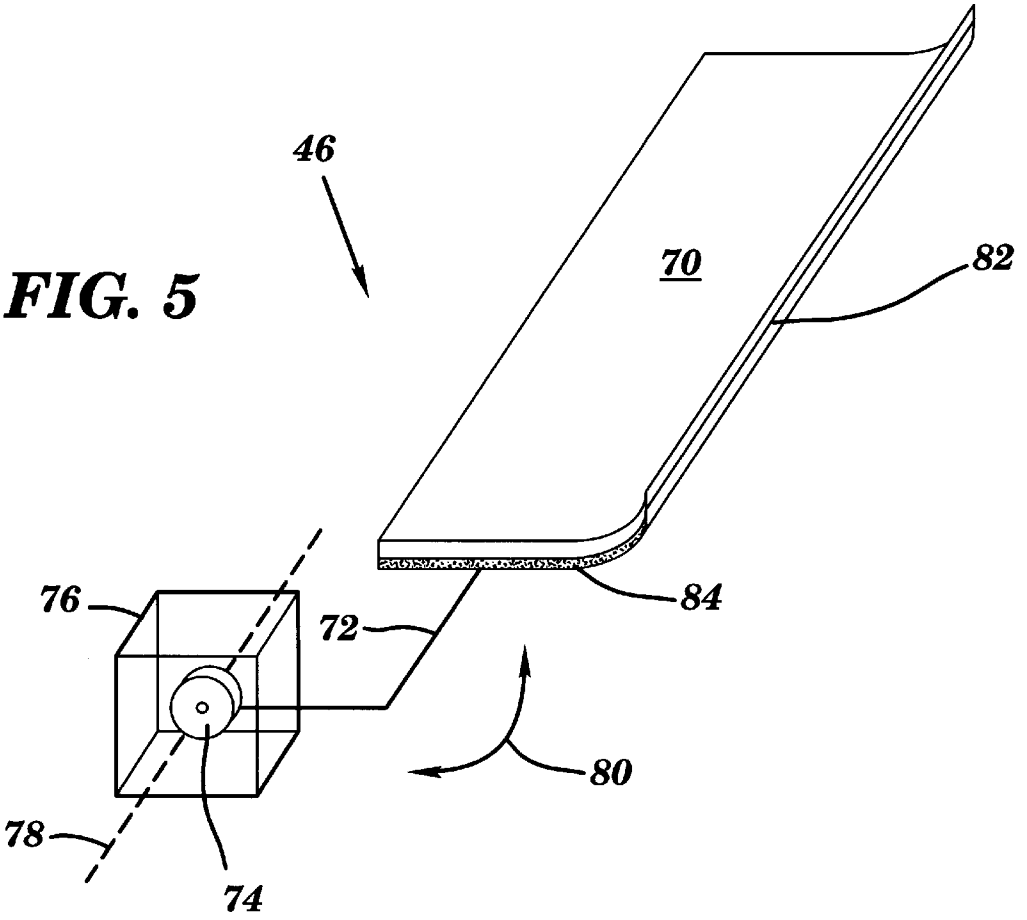
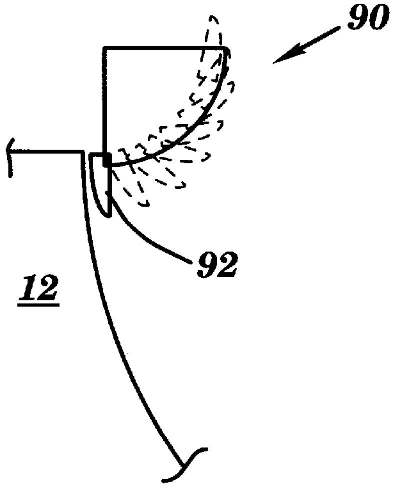
FIG. 6
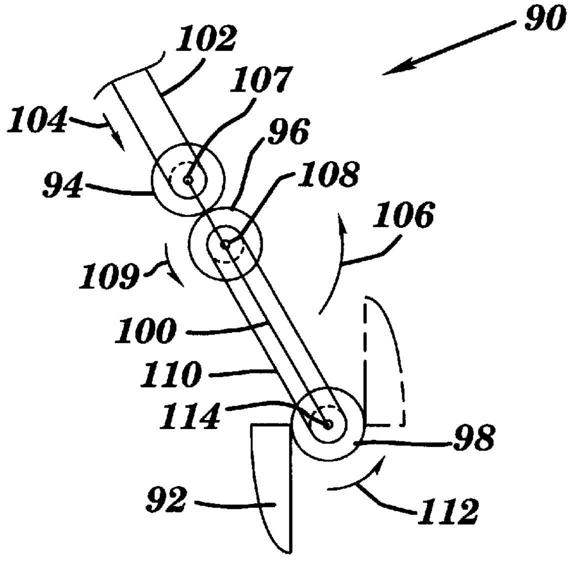
FIG. 7

MEDIA GUIDANCE SYSTEM FOR A SCANNING SYSTEM

FIELD OF THE INVENTION

The present invention relates in general to scanning systems. More particularly, the present invention is directed to a media guidance system for substantially reducing media jamming in an internal drum type laser imagesetter as the leading (head) end of a web of recording media is directed over the drum surface and through the exit aperture of the internal drum during a media loading procedure.

BACKGROUND OF THE INVENTION

In a typical internal drum type laser imagesetter, a section of a web of recording media is drawn from a supply roll and subsequently positioned on the surface of a drum shaped media support surface. During an initial loading procedure, the leading end of the recording media is pulled off the supply roll and directed onto the surface of the internal drum, ultimately passing out of the internal drum through an exit aperture. Thereafter, an image scanning system directs a focused, modulated, exposure beam (e.g. scanning laser beam) across the recording media, producing a series of exposed scan lines representing an image to be recorded.

Under optimal conditions, where surface to surface contact is maintained as the recording media is directed over the surface of the internal drum during the initial loading procedure, the leading end of the recording media will usually pass out of the internal drum through the exit aperture without jamming. In practice, however, the leading end of web-fed recording media will commonly lift or curl away from the surface of the internal drum, oftentimes jamming within the drum before successfully passing through the exit aperture. The problem of media curl is even more prevalent when the section of the recording media to be loaded onto the surface of the internal drum is drawn off the end of the supply roll, where the relative curvature of the recording media is the greatest.

Accordingly, it is a specific object of the present invention to significantly reduce media jamming during an initial media loading procedure by maintaining and maximizing surface to surface contact between the recording media and the surface of the internal drum as the leading end of the recording media is passed over the drum surface toward and/or into the exit aperture of the drum.

It is a further object of the present invention to significantly reduce media jamming, lifting and buckling during subsequent media feeding procedures by maintaining surface to surface contact between the recording media and the surface of the internal drum.

SUMMARY OF THE INVENTION

The present invention provides a method and apparatus for substantially reducing media jamming as the leading (head) end of a web of recording media is directed over the drum surface of an internal drum type laser imagesetter during a media loading and/or feeding procedure. A media guidance system, including a hollow shield, at least one outrigger extending laterally away from the hollow shield, and at least one retractable plate assembly for selectively applying a pressure load against the leading end of the recording media as it approaches the exit aperture of the internal drum, is utilized to maximize surface to surface contact between the recording media and the internal drum.

BRIEF DESCRIPTION OF THE DRAWINGS

The objects and features of the invention will best be understood from a detailed description of the invention and a preferred embodiment thereof selected for the purposes of illustration and shown in the accompanying drawings in which:

FIG. 5 is an enlarged view of a retractable plate assembly; and

FIGS. 6 and 7 illustrate an alternate embodiment of a retractable plate assembly.

DETAILED DESCRIPTION OF THE INVENTION

Figure 1:
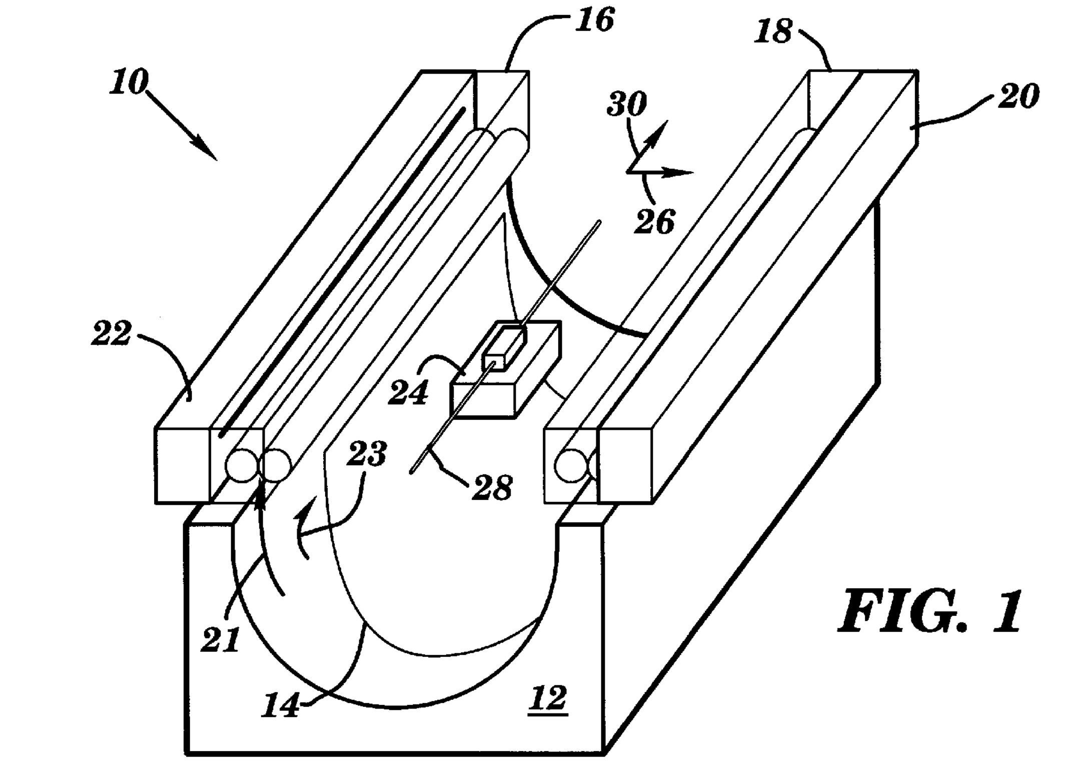
FIG. 1 illustrates an internal drum type laser imagesetter, wherein the leading end of the recording media has curled away from the surface of the internal drum during an initial media loading procedure.

Referring now specifically to the accompanying drawings, there is illustrated a media guidance system for an internal drum type laser imagesetter, wherein like reference numerals refer to like elements throughout the drawings.

An internal drum type imagesetter 10, which is susceptible to media jamming during an initial media loading procedure, is illustrated in FIG. 1. The imagesetter 10 generally includes a cylindrically shaped internal drum 12 for supporting a section of a web of recording media 14 during a scanning procedure. A media transport and loading system, including an exit nip assembly 16 (exit aperture) and an entrance nip assembly 18 (entrance aperture), is utilized to direct and load a section of the recording media 14, supplied via a supply roll or cassette 20, onto the surface of the drum 12 for scanning. After exposure, the recording media 14 may be rewound onto a take-up roll or cassette 22 for subsequent processing, or may be cut from the web and immediately developed using an on-line processor.

Ideally, as indicated by directional arrow 21, the leading end of the recording media will successfully pass into the exit nip assembly 16 without jamming. Unfortunately, as indicated by directional arrow 23, the leading end of the recording media will oftentimes curl away from the surface of the drum, resulting in an undesirable jamming condition near the exit nip assembly 16.

The internal drum type laser imagesetter 10 further includes a scanning laser mechanism 24 for directing a focused, modulated scanning laser beam (not shown) onto the recording media 14, parallel to scan direction 26, exposing a scan line (not shown). A cross-scan transport mechanism 28, of a type commonly utilized by internal drum type laser imagesetters, displaces the scanning laser mechanism 24 longitudinally through the internal drum 12 at a constant cross-scan velocity along cross-scan direction 30. As depicted in FIG. 1, the cross-scan direction 30 is perpendicular to the scan direction 26.

The operation of a preferred embodiment of a media guidance system 40, in accordance with a preferred embodiment of the present invention, is illustrated in FIGS. 2A–2D. For simplicity, the media guidance system 40 is incorporated into an internal drum type laser imagesetter 10 which is similar to the imagesetter illustrated in FIG. 1. Of course, it should be readily apparent that the media guidance system of the present invention may be utilized as necessary to reduce media jamming within other types of scanning systems without departing from the scope of the present invention.

The media guidance system 40 generally includes a hollow shield 42, a pair of outriggers 44 which extend laterally away from opposing sides of the hollow shield, and a pair of retractable plate assemblies 46 for selectively applying a pressure load against the leading end 48 of the recording media 14 as it approaches the exit nip assembly 16 of the internal drum 12. As detailed below, the hollow shield 42 and attached outriggers 44 are fixed to the scanning laser mechanism 24, while the pair of retractable plate assemblies 46 are fixed in relation to the drum 12.

The hollow shield 42 serves several important functions. First, by enclosing the scanning laser beam (not shown) produced by the scanning laser mechanism 24 during a scanning operation, the hollow shield 42 acts as a protective air and light baffle. Second, the hollow shield 42, which is typically center justified within the drum 12 during an initial media loading procedure, guides the leading end of the recording media over the surface of the drum toward the exit nip assembly 16, thereby preventing the central portion of the recording media from curling or lifting away from the surface of the drum.

Figure 2A:
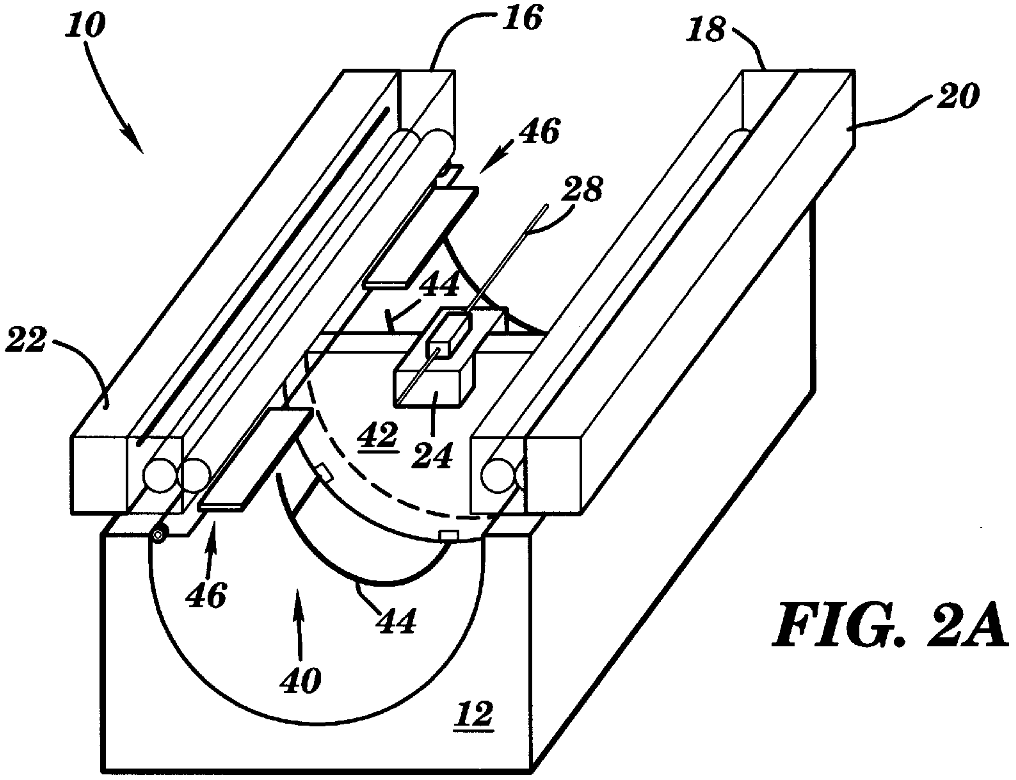
FIGS. 2A, 2B, 2C and 2D are simplified perspective views of an internal drum type laser imagesetter incorporating a media guidance system in accordance with a preferred embodiment of the present invention.
Figure 2B:
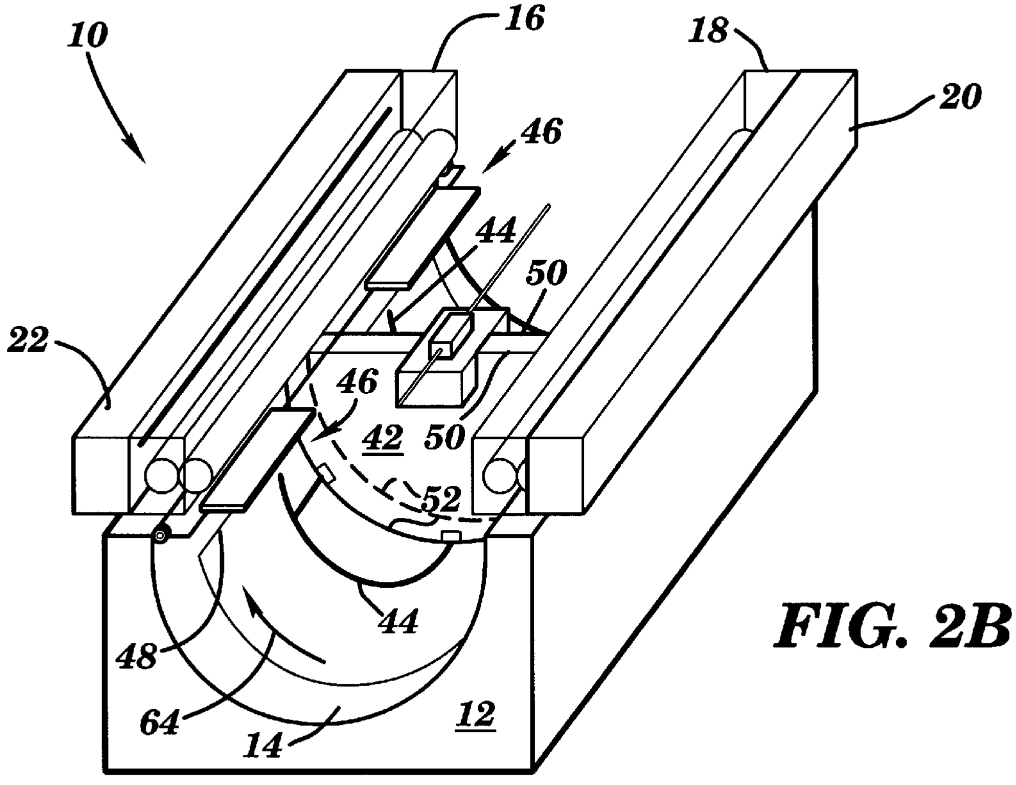
Figure 2C:
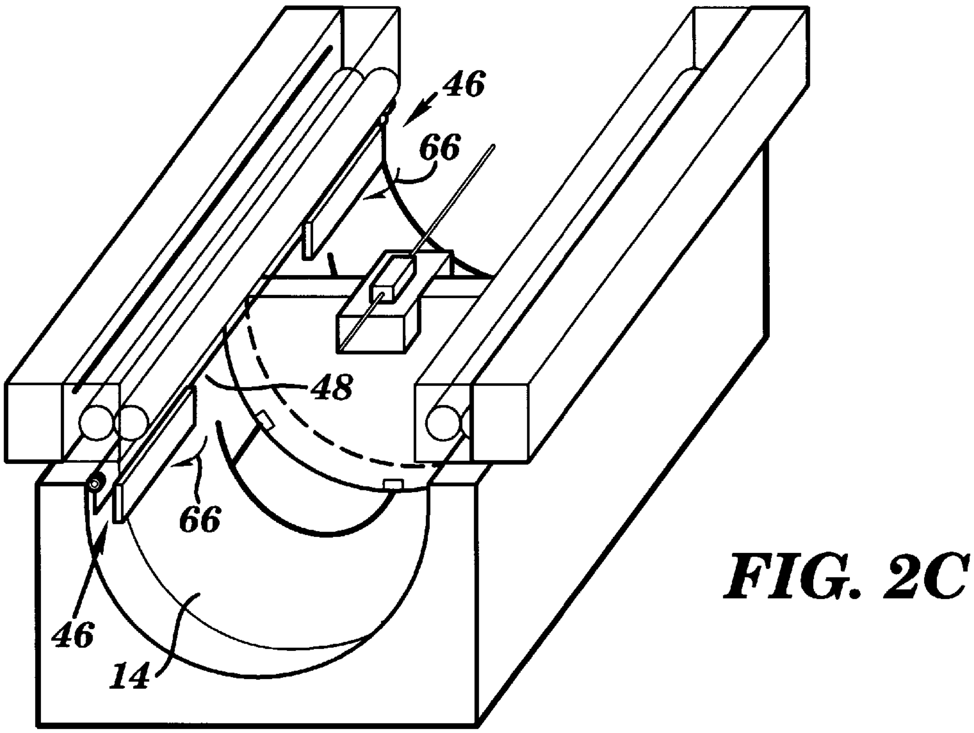

The hollow shield 42 includes a pair of opposing fan shaped members 50 which extend toward the surface of the drum 12 from the scanning laser mechanism 24 (FIG. 2B). Preferably, the distal rim portions 52 of the fan shaped members 50 are uniformly positioned a predetermined distance from the surface of the drum. Clearly, if the predetermined distance between the distal rim portions 52 and the surface of the drum 12 is slightly greater than the thickness of the recording media, media curling and lifting is substantially eliminated below the hollow shield.

Figure 3:
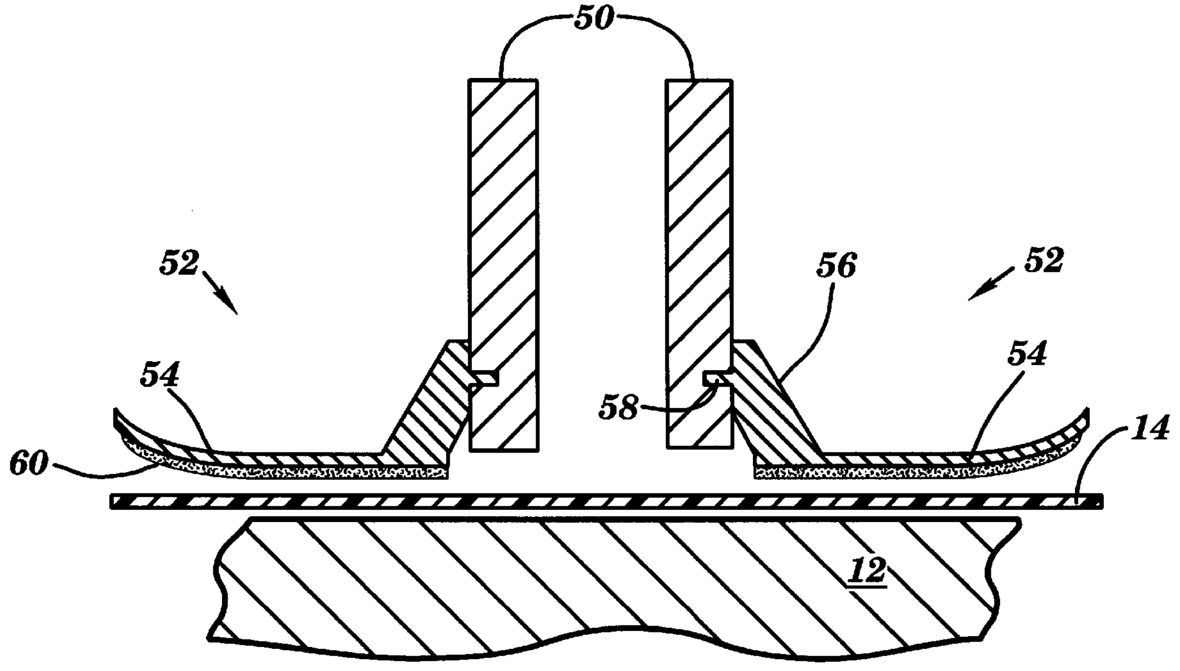
FIG. 3 is a partial cross-sectional view of the distal rim portions of the fan shaped members forming the hollow shield.

An enlarged, partial cross-sectional view of the distal rim portions 52 of the fan shaped members 50 is provided in FIG. 3. Each rim portion 52 includes a substantially planar flange 54 which extends away from an associated fan shaped member 50, about the periphery thereof, toward an opposing end of the internal drum 12. Each flange 54 includes a support 56 which may be fixed proximate the end of a corresponding fan shaped member 50 using any suitable securing hardware 58. The end of each flange 54 is turned slightly away from the surface of the drum 12 to prevent the flange 54 from damaging the recording media 14 as the media is displaced over the surface of the drum 12 during a registration procedure. A layer of TEFLON 60, or other suitable nonabrasive material, preferably provided in tape form, is affixed to the underside of the flanges 54 to reduce frictional damage to the surface of the recording media 14 during media displacement.

Figure 4C:
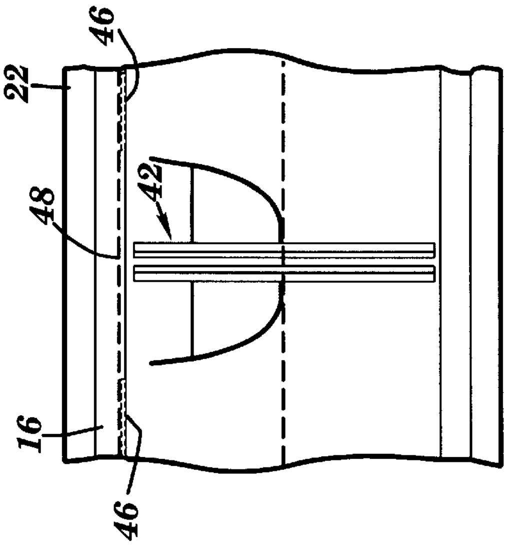
FIGS. 4A, 4B and 4C are partial plan views illustrating the operation of the media guidance system of the present invention.
Figure 4B:
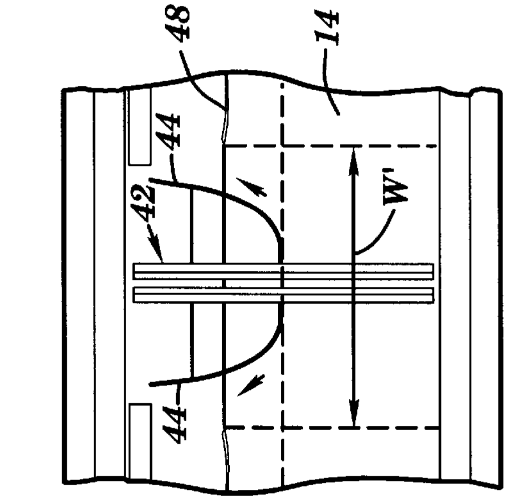
Figure 4A:
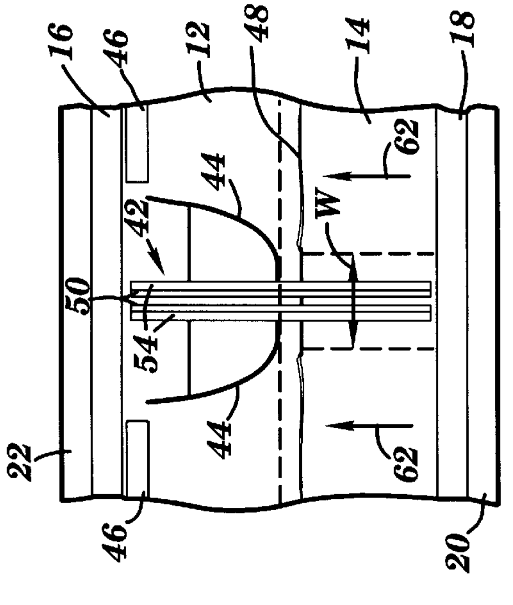

Referring now specifically to FIGS. 4A, 4B and 4C, there is illustrated a sequence of partial plan views illustrating the general operation of the media guidance system 40. In the preferred embodiment of the present invention, a pair of outwardly extending outriggers 44, each preferably having a curvature corresponding to the curvature of the internal drum 12, are suitably mounted to opposing sides of the hollow shield 42. Of course, it should be readily apparent that any number of outriggers 44 may be utilized in the practice of the present invention. The outriggers 44 are positioned a predetermined distance above the surface of the drum 12, forming a gap therebetween which prevents the recording media from curling or lifting away from the surface of the drum. Again, a nonabrasive material (not shown), may be secured to the underside of the outriggers 44 to limit frictional damage to the surface of the recording media 14 during media displacement.

As shown in FIG. 4A, the leading end 48 of a section of recording media 14, provided via supply roll 20, has been inserted between the flanges 54 of the fan shaped members 50 and the surface of the drum 12 by the entrance nip assembly 18. As the leading end 48 of the recording media 14 is displaced toward the bottom of the drum (directional arrows 62), again under control of the entrance nip assembly 18, a section of the recording media having a width W is prevented from curling or lifting away from the drum surface by the flanges 54. As the leading end 48 of the recording media reaches and passes underneath the pair of outriggers 44 (FIG. 4B), an even wider section of the recording media, having an increasing width W', is prevented from curling or lifting away from the surface of the drum. Thus, the flanges 54 and the pair of outriggers 44 cooperate to maintain surface to surface contact between the drum and the recording media as the leading end 48 of the recording media is directed toward the exit nip assembly 16 (exit aperture) of the drum.

The pair of retractable plate assemblies 46 are maintained in an extended position as the recording media passes over the surface of the drum (FIGS. 4A, 4B). When the leading end 48 of the recording media is positioned adjacent the exit nip assembly 16 of the drum, media displacement is temporarily halted as the retractable plate assemblies 46 are retracted against the leading end 48 (FIG. 4C). In the retracted position, the retractable plate assemblies 46 are maintained a predetermined distance from the surface of the drum, creating a gap which is small enough to substantially flatten the leading end 48 of the recording media against the surface of the drum, while large enough to permit subsequent displacement of the recording media into and through the exit aperture of the drum. Advantageously, the retractable plate assemblies 46 are designed to accurately and uniformly position the leading end 48 of the recording media near the exit aperture of the drum, thereby substantially eliminating media jamming when the leading end of the recording media is subsequently directed into the exit aperture. Preferably, the retractable plate assemblies 46 are positioned at least near the opposing ends of the internal drum 12 where media curling and lifting is generally more prevalent.

The operation of a preferred embodiment of the media guidance system 40 is further illustrated in FIGS. 2A–2D. In FIG. 2A, the components of the media guidance system 40, including the hollow shield 42, the pair of outriggers 44 and the pair of retractable plate assemblies 46, are shown in their pre-loading orientation, with the hollow shield 42 positioned centrally within the drum 12. The retractable plate assemblies 46 are maintained in an extended position awaiting the arrival of the leading end 48 of the recording media.

During the initial stages of the media loading procedure, the leading end of the recording media 14 is directed between the flanges 54 of the hollow shield 42 and the surface of the drum 12 by the entrance nip assembly 18 (directional arrow 64). As the recording media 14 passes across the surface of the drum, the hollow shield 42 and the pair of outriggers 44 prevent the central area of the recording media from curling or lifting away from the drum surface. As stated above, the retractable plate assemblies 46 remain in an extended position during this stage of the media loading procedure.

Figure 2D:
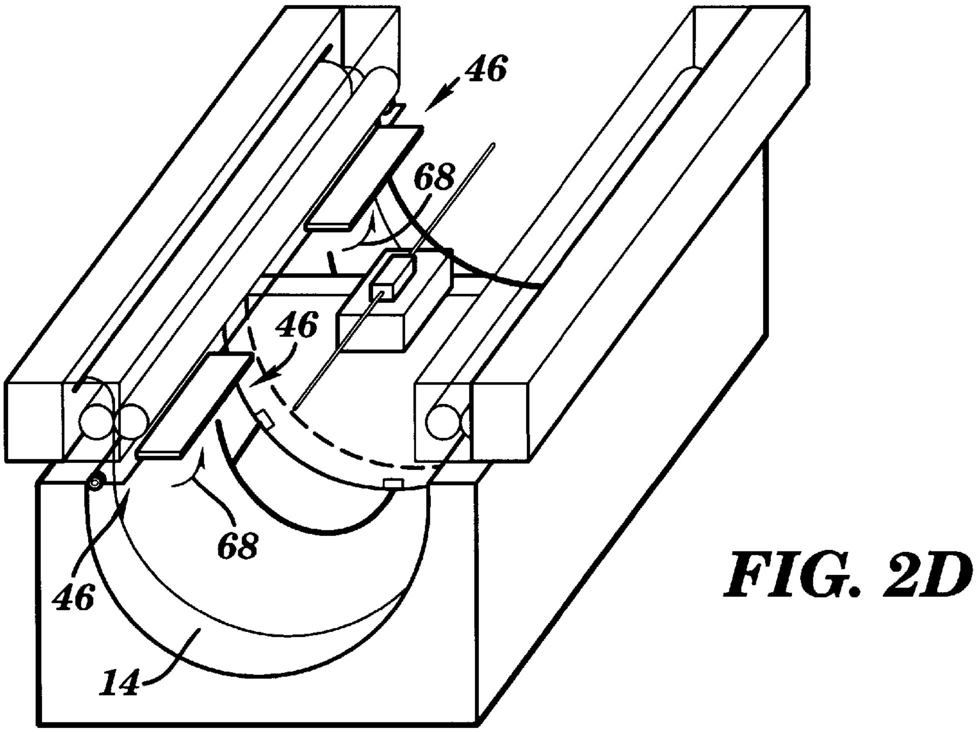

Immediately before the leading end 48 of the recording media reaches the exit nip assembly 16 (exit aperture), displacement of the recording media 14 is temporarily halted. As indicated by directional arrows 66 in FIG. 2C, the pair of retractable plate assemblies 46 are subsequently retracted, effectively sandwiching the leading end 48 of the recording media against the surface of the drum 12. Thereafter, media displacement resumes under control of the entrance nip assembly 16, inserting the leading end 48 of the recording media 14 into the exit nip assembly 16 and completing the initial media loading procedure. Upon successful loading of the recording media, the retractable plate assemblies 46 are returned to their extended position as indicated by directional arrows 68 (FIG. 2D). In the extended position, the retractable plate assemblies 46 do not interfere with the hollow shield 42 as the laser scanning mechanism 24 and attached hollow shield 42 are displaced longitudinally along the drum 12 by the transport mechanism 28 during a scanning operation. If desired, means for applying a pressure load, such a brush or the like, may be secured to the distal rim portions 52 of the fan shaped members 50 to urge the media into full contact against the drum, substantially reducing media lifting in the immediate vicinity of the laser scanning beam during a scanning operation. Additionally, it should be noted that the flanges 54 and the pair of outriggers 44 are adapted to maintain surface to surface contact between the drum and the recording media during subsequent media feeds, thereby preventing the recording media from jamming, lifting or buckling within the drum.

Referring now specifically to FIG. 5, there is illustrated an enlarged view of a retractable plate assembly 46 in an extended position. The retractable plate assembly 46 includes a plate member 70, a support shaft 72 and a rotatable bearing 74. An actuator 76, such as a motor or the like, is utilized to rotate the rotatable bearing 74 about an axis 78 to selectively displace the plate member 70 between extended and retracted positions. The displacement of the plate member 70 is generally indicated by directional arrow 80. As shown, the plate member 70 has a curvature substantially corresponding to the curvature of the internal drum 12. Further, the lower lip 82 of the plate member 70 is curved away from the surface of the drum to guide the recording media 14 underneath the plate member 70. Again, the underside of the plate member 70 may be covered in any suitable manner with a nonabrasive and/or friction reducing material 84 to avoid damaging the surface of the recording media during media displacement.

An alternate embodiment of a retractable plate assembly 90, which is highly suitable for use in an internal drum type laser imagesetter having limited space within the internal drum, is illustrated in FIG. 6. The retractable plate assembly 90 includes a plate member 92 is designed to be rotated as it is simultaneously displaced between extended and retracted positions.

A detailed illustration of the retractable plate assembly 90 is provided in FIG. 7. The retractable plate assembly utilizes a plurality of drive pulleys 94, 96, 98, each mounted to a support 100, to produce the simultaneous displacement and rotation of the plate member 92.

As shown in FIG. 7, the first drive pulley 94 is actuated by a first belt 102. Upon a counterclockwise rotation of the first belt 102 (directional arrow 104), the support 100, which is fixed to the shaft 107 of the first drive pulley 94, is rotated in a counterclockwise direction (directional arrow 106), resulting in a counterclockwise rotation of the second drive pulley 96 about shaft 108 (directional arrow 109). As should be readily apparent to those skilled in the art, the first and second drive pulleys 94, 96 may be linked through the utilization of a suitable gearing arrangement, a frictional coupling, or the like. The counterclockwise rotation of the second drive pulley 96 effects a counterclockwise rotation of a second belt 110, which, in turn, rotates the third drive pulley 98 and attached plate member 92 in a counterclockwise direction (directional arrow 112) about shaft 114. Of course, a clockwise rotation of the first belt 102 will result in an oppositely directed, clockwise displacement of the plate member 92. Thus, a rotation of the first belt 102 results in the simultaneous displacement and rotation of the plate member 92.

Having described in detail a preferred embodiment of the present invention, it will now be apparent to those skilled in the art that numerous modifications can be made therein without departing from the scope of the invention as defined in the following claims. For example, at least one retractable plate assembly may be utilized to initially guide the leading end of the recording media between the flanges of the of the fan shaped members and the surface of the drum. Further, it should be readily apparent that the hollow shield, the outriggers, and the retractable plate assemblies may be utilized separately or in any combination to reduce media jamming within a scanning system.

We claim:

1. In an optical scanner including a media support surface and a media loading system for directing a supply of recording media onto said media support surface during a media loading procedure, a media guidance system comprising:

means for guiding said recording media against said media support surface during said media loading procedure;

means for positioning said guiding means a predetermined distance away from said media support surface, thereby forming a gap through which said recording media is directed by said media loading system during said media loading procedure;

wherein said media support surface includes an exit aperture toward which a leading end of said recording media is directed by said media loading system during said media loading procedure, and wherein said media guidance system further includes means for flattening the leading end of said recording media against said media recording surface at said exit aperture to prevent the leading end of said recording media from jamming at said exit aperture.

2. The media guidance system according to claim 1, wherein, during said media loading procedure, the leading end of said recording media passes through an entrance aperture, passes over the surface of said media support surface, and passes into said exit aperture, said guiding means extending across said media support surface between said entrance aperture and said exit aperture.

3. The media guidance system according to claim 1, wherein said media support surface is a drum having a given surface curvature, and wherein a distal end section of said guiding means has a curvature corresponding to the surface curvature of said drum, said positioning means positioning the distal end section of said guiding means a predetermined distance away from said media support surface forming a gap through which said recording media is directed during said media loading procedure.

4. The media guidance system according to claim 1, wherein said media guidance system further includes:

at least one projecting member, extending transversely away from said guiding means, for preventing said recording media from lifting away from said media support surface during said media loading procedure.

5. The media guidance system according to claim 4, wherein said media support surface is a drum having a given surface curvature, and wherein said at least one projecting member has a curvature corresponding to the surface curvature of said drum.

6. The media guidance system according to claim 1, wherein said means for flattening the leading end of said recording media against said media recording surface at said exit aperture further includes:

a plate member; and means for selectively applying said plate member against the leading end of the recording media, said plate member and said media support surface forming a gap through which said recording media is directed during said media loading procedure.

7. The media guidance system according to claim 6, wherein said media support surface is a drum having a given surface curvature, and wherein said plate member has a curvature corresponding to the surface curvature of said drum.

8. The media guidance system according to claim 6, wherein said means for selectively applying said plate member against the leading end of the recording media further includes:

means for displacing said plate member between retracted and extended positions; and means for rotating said plate member as said plate member is displaced between said retracted and extended positions.

9. A method for guiding a supply of recording media onto a media support surface of an optical scanner, including the steps of:

directing a leading end of the recording media toward an exit aperture of said media support surface during a media loading procedure; and preventing the leading edge of said recording media from lifting away from said media support surface at said exit aperture by providing a plate member and removably sandwiching said plate member against the leading end of said recording media at said exit aperture, said plate member and said media support surface forming a gap through which said recording media is directed during said media loading procedure.

10. A media guidance system for a scanning system, said scanning system including a drum for supporting a supply of recording media, a media transport system for displacing a leading end of said recording media onto said drum toward an exit aperture, a scanning laser mechanism for directing a scanning laser beam toward said drum, and a hollow shield for enclosing said scanning laser beam, comprising:

means, mounted to a distal end section of said hollow shield, for preventing a first portion of said recording media, adjacent said hollow shield, from lifting away from said drum as said media transport system displaces the leading end of said recording media toward said exit aperture during a media loading procedure;

at least one projecting member, extending transversely away from said hollow shield, for preventing a second portion as said recording media from lifting away from said drum; and means for flattening the leading end of said recording media against said drum at said exit aperture to prevent the leading end of said recording media from jamming at said exit aperture.

11. The media guidance system according to claim 10, wherein said means for flattening the leading end of said recording media against said drum further includes:

a retractable assembly for selectively sandwiching the leading end of the recording media against said drum at said exit aperture.

12. The media guidance system according to claim 11, wherein said retractable assembly further includes:

a plate member; and, means for selectively positioning said plate member near said media support surface, said plate member and said drum forming a gap through which said recording media is directed during said media loading procedure.

13. In an optical scanner including a media support surface and a media loading system for directing a supply of recording media onto said media support surface during a media loading procedure, a media guidance system comprising:

a guide assembly for directing said recording media against said media support surface during said media loading procedure; and a device for positioning said guide assembly a predetermined distance away from said media support surface, thereby forming a gap through which said recording media is directed by said media loading system during said media loading procedure;

wherein, during said media loading procedure, a leading end of said recording media passes through an entrance aperture of said scanner, passes over the surface of said media support surface through said gap, and passes into an exit aperture of said scanner, said guide assembly extending across a portion of said media support surface between the entrance and exit apertures of said scanner.

14. The media guidance system according to claim 13, wherein said media support surface is a drum having a given surface curvature, and wherein a distal end section of said guide assembly has a curvature corresponding to the surface curvature of said drum.

15. The media guidance system according to claim 13, wherein said guide assembly prevents a first portion of said recording media from lifting away from said media support surface during said media loading procedure.

16. The media guidance system according to claim 15, wherein said media guidance system further includes:

at least one projecting member, extending transversely away from said guide assembly, for preventing a second portion of said recording media from lifting away from said media support surface during said media loading procedure.

17. The media guidance system according to claim 16, wherein said media support surface is a drum having a given surface curvature, and wherein each projecting member has a curvature corresponding to the surface curvature of said drum.

18. The media guidance system according to claim 13, wherein said media guidance system further includes:

an assembly for directing the leading end of said recording media against said media recording surface adjacent said exit aperture.

19. The media guidance system according to claim 18, wherein said directing assembly further includes:

at least one plate member; and a system for selectively applying said at least one plate member against the leading end of the recording media, forming a gap through which said recording media is directed during said media loading procedure.

20. The media guidance system according to claim 19, wherein said media support surface is a drum having a given surface curvature, and wherein said at least one plate member has a curvature corresponding to the surface curvature of said drum.

21. The media guidance system according to claim 19, wherein said system for selectively applying said at least one plate member against the leading end of the recording media further includes:

a system for displacing said at least one plate member between retracted and extended positions; and, a system for rotating said at least one plate member as it is displaced between said retracted and extended positions.

22. The media guidance system according to claim 13, wherein said optical scanner includes a scanning laser mechanism for producing a scanning laser beam, wherein said positioning device includes a hollow shield for enclosing said scanning laser beam.

23. The media guidance system according to claim 22, wherein a distal end of said hollow shield includes said guide assembly.

24. The media guidance system according to claim 23, wherein said guide assembly includes at least one projecting member, extending transversely away from the distal end of said hollow shield, for preventing a portion of said recording media from lifting away from said media support surface during said media loading procedure.

25. The media guidance system according to claim 24, wherein an underside of said at least one projecting member is covered with a nonabrasive material.

26. The media guidance system according to claim 24, wherein said media support surface is a drum having a given surface curvature, and wherein said at least one projecting member has a curvature corresponding to the surface of said drum.

27. An optical scanner comprising:

a media support surface;

a media loading system for directing a supply of recording media onto said media support surface during a media loading procedure;

a media guidance system including a guide assembly for directing said recording media against said media support surface during said media loading procedure, and a device for positioning said guide assembly a predetermined distance away from said media support surface; and, a scanning laser mechanism for producing a scanning laser beam, wherein said positioning device includes a hollow shield for enclosing said scanning laser beam;

wherein said media support surface is a drum having a given surface curvature, and wherein a distal end section of said guide assembly has a curvature corresponding to the surface curvature of said drum, said positioning device positioning the distal end section of said guide assembly a predetermined distance away from said media support surface forming a gap through which said recording media is directed during said media loading procedure.

28. The optical scanner according to claim 27, wherein said guide assembly includes at least one projecting member, extending transversely away from said hollow shield, for preventing a portion of said recording media from lifting away from said media support surface during said media loading procedure.

29. The optical scanner according to claim 27, further including:

an assembly for directing a leading end of said recording media against said media recording surface adjacent an exit aperture of said optical scanner.

30. A media guidance system for an optical scanner, said optical scanner including a media support surface and a media loading system for directing a supply of recording media onto said media support surface during a media loading procedure, comprising:

a guide assembly for directing said recording media against said media support surface during said media loading procedure; and a device for positioning said guide assembly a predetermined distance away from said media support surface, thereby forming a first gap through which said recording media is directed by said media loading system during said media loading procedure;

wherein said media support surface includes an exit aperture toward which a leading end of said recording media is directed during said media loading procedure, and wherein said guide assembly includes an assembly for directing the leading end of said recording media against said media recording surface adjacent said exit aperture, said directing assembly including at least one plate member, and a system for selectively applying said at least one plate member against the leading end of the recording media, forming a second gap through which said recording media is directed during said media loading procedure.

31. The media guidance system according to claim 30, wherein said media support surface is a drum having a given surface curvature, and wherein each plate member has a curvature corresponding to the surface curvature of said drum.

32. The media guidance system according to claim 30, wherein said system for selectively applying said at least one plate member against the leading end of the recording media further includes:

a system for displacing said at least one plate member between retracted and extended positions; and, a system for rotating said at least one plate member as it is displaced between said retracted and extended positions.

33. The media guidance system according to claim 30, wherein an underside of said at least one plate member is covered with a nonabrasive material.

* * * * *